United States Patent [19]

Cone et al.

[11] Patent Number: 5,092,004

[45] Date of Patent: Mar. 3, 1992

[54] CONVERTIBLE INFANT RESTRAINT DEVICE

[75] Inventors: Richard E. Cone, Dayton, Ohio; Donald L. Gerken, Columbus, Ind.

[73] Assignee: Cosco, Inc., Columbus, Ind.

[21] Appl. No.: 514,927

[22] Filed: Apr. 26, 1990

Related U.S. Application Data

[63] Continuation-in-part of Ser. No. 256,040, Oct. 11, 1988, Pat. No. 4,998,307.

[51] Int. Cl.⁵ .............................................. A47D 7/04
[52] U.S. Cl. .......................................... 5/94; 297/250; 297/183; 297/118
[58] Field of Search ...................... 5/94; 297/250, 216, 297/316, 183, 316, 319, 378, 118

[56]         References Cited
        U.S. PATENT DOCUMENTS

| | | |
|---|---|---|
| 567,096 | 9/1896 | Harvey et al. . |
| 1,876,111 | 9/1932 | Van Guelpen ................. 297/378 |
| 2,286,784 | 6/1942 | Benzick et al. . |
| 2,633,895 | 4/1953 | Battles ................. 297/378 |
| 2,664,140 | 12/1953 | Kindelsberger . |
| 2,676,336 | 4/1954 | Gilmer . |
| 2,720,911 | 10/1955 | Lantz ................. 297/183 |
| 2,777,502 | 1/1957 | Travis . |
| 2,845,234 | 7/1958 | Cushman et al. . |
| 3,054,637 | 9/1962 | Pambello . |
| 3,159,850 | 12/1964 | Aldrich et al. . |
| 3,203,731 | 8/1965 | Krueger ................. 247/378 |
| 3,361,475 | 1/1968 | Villiers . |
| 3,366,294 | 1/1968 | Stephenson . |
| 3,381,315 | 5/1968 | Glassberg . |
| 3,385,633 | 5/1968 | Aizley . |
| 3,528,703 | 9/1970 | Ohta ................. 297/391 |
| 3,579,673 | 5/1971 | Hirschey . |
| 3,833,946 | 9/1974 | Von Wimmersperg . |
| 3,994,513 | 11/1976 | Courtis et al. . |
| 4,169,626 | 10/1979 | Hollar ................. 297/378 |
| 4,186,961 | 2/1980 | Farrell, Jr. et al. . |
| 4,231,612 | 11/1980 | Meeker . |
| 4,274,674 | 6/1981 | Deloustal . |
| 4,366,587 | 6/1983 | Takada ................. 5/94 |
| 4,376,551 | 3/1983 | Cone . |
| 4,436,341 | 3/1984 | Converse . |
| 4,500,133 | 2/1985 | Nakao et al. . |
| 4,500,135 | 2/1985 | Kincheloe . |
| 4,501,032 | 2/1985 | Heath et al. . |
| 4,615,562 | 10/1986 | Bell et al. . |
| 4,634,177 | 1/1987 | Meeker ................. 297/183 |
| 4,688,850 | 8/1987 | Brownlie ................. 297/183 |
| 4,709,960 | 12/1987 | Launes . |
| 4,743,063 | 5/1988 | Foster, Jr. . |
| 4,754,999 | 7/1988 | Kain . |
| 4,762,364 | 8/1988 | Young . |
| 4,883,243 | 11/1989 | Herndon ................. 297/216 |

FOREIGN PATENT DOCUMENTS

| | | |
|---|---|---|
| 0009439 | 4/1980 | European Pat. Off. . |
| 2651141 | 5/1977 | Fed. Rep. of Germany . |
| 3445497 | 6/1986 | Fed. Rep. of Germany . |
| 2306853 | 11/1976 | France . |
| 2347010 | 11/1976 | France . |
| WO86/02050 | 4/1986 | PCT Int'l Appl. . |
| 258398 | 9/1926 | United Kingdom ................. 5/94 |
| 1424093 | 2/1976 | United Kingdom . |
| 2072003 | 9/1981 | United Kingdom . |

Primary Examiner—Gary L. Smith
Assistant Examiner—F. Saether
Attorney, Agent, or Firm—Barnes & Thornburg

[57]            ABSTRACT

A restraint device is provided for securing and supporting an infant. The device includes a shell assembly formed to include a chamber sized to receive the infant. The shell assembly includes first and second spaced apart side walls and a generally rigid end wall defining a boundary of the chamber. In one embodiment, the rigid end wall includes a yieldable section movable between a fixed first position and a yielded second position in response to a force acting against the yieldable section. In another embodiment, the restraint device includes an upper shell portion coupled to a lower shell portion and a foldable seat situated inside the lower shell portion to provide means for supporting a lower portion of an infant.

38 Claims, 5 Drawing Sheets

CONVERTIBLE INFANT RESTRAINT DEVICE

BACKGROUND AND SUMMARY OF THE INVENTION

This application is a continuation-in-part of copending application Ser. No. 07/256,040 filed Oct. 11, 1988, now U.S. Pat. No. 4,998,307.

The present invention relates to vehicle infant restraint devices. More particularly, the present invention relates to an infant restraint device which is convertible for use either as an infant car bed or as a rear-facing infant seat.

It has been recognized for some period of time that it is desirable, and in some instances necessary, to transport small infants in a prone position in a motor vehicle. In such instances, it is of utmost importance to be able to secure the infant adequately within the motor vehicle. The ability to transport small infants in a motor vehicle safely is desirable for several reasons. First, most healthy newborn infants under a certain age are much more comfortable and more easily transported in a position in which they can sleep in the supine position. Most conventional car seats are not designed to support very young infants while they are sleeping, at least not in a comfortable position. Second, for premature or low birth weight infants, it is not only desirable, but often mandatory to transport such infants in a supine position. Additionally, certain medically fragile infants must also be transported in a supine or prone position, not only for the comfort of the infant but also to avoid any complications with any of the medical problems of the infant. Finally, infants with certain breathing disorders, such as apnea, need to be transported in a prone position to ensure that they can breathe adequately.

It would be advantageous to provide an infant car bed which could be used for all of the types of infants described above, but which could be converted into a rear-facing infant seat when the infant grows beyond a weight of approximately 14 pounds. Such a convertible infant restraint device could then be used for a long period of time and thus, the demand for such a device would be increased.

One object of the present invention is to provide a yieldable section in a wall defining an infant-carrying space in an infant restraint device to cushion an infant traveling in the device in the event that the device is subjected to strong or sudden external forces.

Another object of the present invention is to provide an adjustable infant restraint device that can be unfolded to provide a car bed for young infants and folded partly to provide a chair seat and chair back fixed with respect to one another so that the car bed is converted into a rear-facing car seat suitable for older infants and babies.

Yet another object of the present invention is to provide an infant restraint device having an improved means for connecting to a conventional lap safety belt system in a vehicle.

According to the present invention, a restraint device is provided for securing and supporting an infant. The device includes a shell assembly having lower and upper shell portions. The device further includes means for pivotably connecting the upper shell portion to the lower shell portion for movement between a first generally planar orientation in which the lower and upper shell portions are aligned in longitudinally extending end-to-end relation to provide a flat bed and a second angular orientation in which the lower and upper shell portions are aligned at an angle with respect to one another to provide a chair. The shell assembly is formed to include a chamber sized to receive the infant. The shell assembly includes a generally rigid end wall defining a boundary of the chamber and a yieldable section formed in the end wall. The yieldable section is movable relative to the end wall in response to a force acting against the end wall to cushion the occupant of the chamber during a sudden stop or accident involving the vehicle carrying the infant restraint device.

The device further includes a handle rotatably coupled to the shell assembly for movement relative to the shell assembly in first and second directions about an axis of rotation between a continuum of angular positions. Means for adjusting the angular position of the handle relative to the shell assembly is also provided. The device further includes stop means for blocking movement of the handle to limit the range of movement of the handle relative to the shell assembly between first and second predetermined angular positions. Advantageously, the handle is movable with respect to the shell to a variety of useful positions to permit a parent to use the device as a basket or a gently inclined cradle.

A foldable support member is also provided to lie inside the chamber of the shell assembly. The foldable support member includes an upper pad coupled to the upper shell portion and a lower pad coupled to the lower shell portion. The lower pad is appended to the upper pad along an edge thereof. The upper and lower pads fold along the edge in response to movement of the upper and lower shell portions from the second angular orientation to the first generally planar orientation. Advantageously, the upper and lower pads cooperate to provide a chair seat on which an older infant or baby can sit comfortably when the infant restraint device has been converted for use as a rear-facing car seat. The infant restraint device is converted quickly and easily to provide a car bed by pivoting the upper and lower shell portions away from one another. This movement causes the upper and lower pads to fold toward one another to form a lower end of the car bed instead of a chair seat. Essentially, the lower pad provides a side wall of the car bed and the upper pad provides a bottom wall of the car bed.

A pivot arrangement is also provided for pivotably coupling the upper shell portion to the lower shell portion. The pivot arrangement includes a shoulder portion coupled to the upper shell portion and configured to extend toward the lower shell portion. The shoulder portion is movable relative to the lower shell portion upon pivotal movement of the upper and lower shell portions. The pivot arrangement also includes a blocking wall formed in the lower shell portion. Advantageously, blocking wall is positioned to engage the shoulder portion during relative movement of the lower and upper shell portions to block pivotal movement of the upper shell portion relative to the lower shell portion beyond the second angular orientation.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
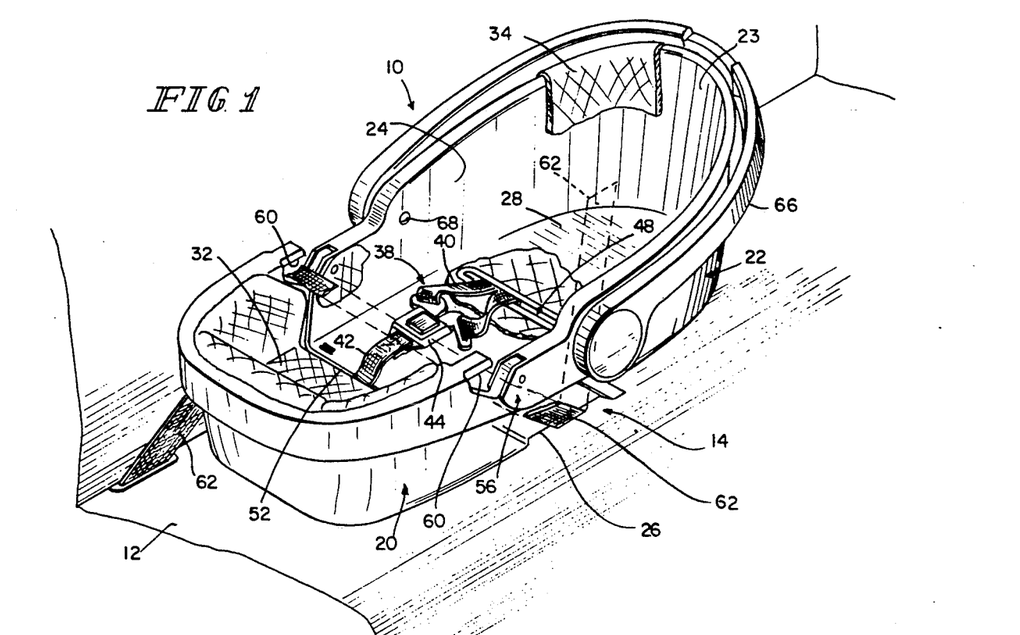
FIG. 1 is a perspective view of one embodiment of a convertible infant restraint device positioned in a car bed orientation and shown placed in the rear seat of a motor vehicle.
Figure 2:
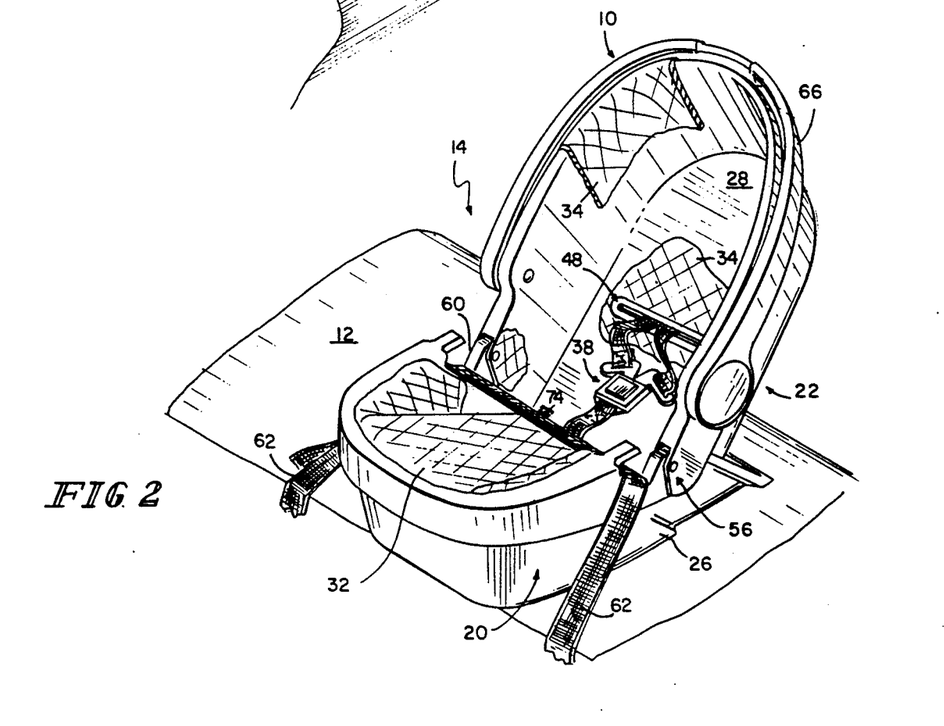
FIG. 2 is a perspective view of the device shown in FIG. 1 after conversion to its rear-facing car seat orientation.

Referring now to the drawings, FIG. 1 shows a convertible infant restraint device 10. The device 10 is capable of being utilized both as a car bed which is illustrated in FIG. 1, and as a standard rear-facing car seat which is illustrated in FIG. 2. FIG. 1 shows the device 10 mounted on an outboard passenger motor vehicle seat 12, with the head portion of the device 10 oriented toward the center of the motor vehicle.

The device 10 includes a generally rigid shell assembly 14 which includes a lower shell portion 20 and an upper shell portion 22. The upper shell portion 22 is configured to receive an upper portion of an infant (not shown), while the lower shell portion 20 is configured to receive the lower portion of the infant. The lower shell portion 20 and upper shell portion 22 are pivotable with respect to each other to permit the shell assembly 14 to be oriented in either a generally planar configuration as shown in FIG. 1, or an angled configuration as shown in FIG. 2. The pivoting mechanism will be described below in the discussion related to FIGS. 4 and 5.

The upper shell portion 22 includes a head portion 23 with depending side wall portions 24. As illustrated in FIG. 1, the side wall portions 24 increase in height toward the head portion 23. This increase in height of the side wall portions 24 toward the head portion 23 provides additional protective characteristics for the infant, and particularly for the infant's head area. The lower shell portion 20 includes a base portion 26 which serves as a support for the device 10.

An upper support surface 28 is included in the upper shell portion 22 which cooperates with a lower support surface 32 which is provided in the lower shell portion 20 to support the infant. The upper support surface 28 and lower support surface 32 cooperate to support the infant both in the planar configuration as shown in FIG. 1, and in the angled configuration as shown in FIG. 2. The lower support surface 32 changes in configuration between the planar configuration and the angled configuration in response to the necessity of providing a seat portion for the infant when in the angled configuration. This change in configuration of the lower support surface 32 will be described below in the discussion related to FIGS. 3 and 4. Illustratively, in the preferred embodiment, a padded cover 34 is provided which covers the inside of the shell assembly 14 to provide comfort and additional protection for the infant.

A harness assembly 38 is provided for securing the infant within the shell assembly 14. The harness assembly 38 includes two shoulder straps 40 and a lower crotch strap 42 which terminates in a harness buckle 44. The two shoulder straps 40 lock into the harness buckle 44 in a conventional manner and cooperate with the lower strap 42 to secure the infant within the shell assembly 14 when the shell assembly 14 is in both the planar configuration (FIG. 1) and the angled configuration (FIG. 2). Because of unique characteristics with the harness assembly 38 which will be discussed below in the discussion related to FIGS. 4 and 6, no adjustment of the harness assembly 38 is necessary when the shell assembly 14 is converted between the planar configuration and the angled configuration. This is advantageous because, with the infant in place and securely strapped in the planar configuration, the shell assembly 14 can be converted to the angled configuration as shown in FIG. 2 without any adjustment of the harness assembly 38 or any repositioning of the infant required.

It has been found that it is desirable to allow the infant to controllably slide toward one of the two side wall portions 24 when exposed to lateral deceleration forces. By permitting the infant to slide controllably toward one of the side wall portions 24, such lateral deceleration forces can be dissipated against the side wall portion 24 and the padded cover 34 to protect the infant, and to prevent the infant from being injured by the harness assembly 38. Under lateral deceleration forces, it is possible for an infant's shoulders to actually roll out from under the shoulder straps 40 if the harness assembly 38 does not permit such sliding movement toward the side wall portions 24. The harness assembly 38 includes a sliding arrangement to permit such lateral sliding movements under lateral deceleration forces. An upper strap slot assembly 48 is provided in the upper support surface 28 to permit the shoulder straps 40 to move laterally. Additionally, a lower strap slide 52 is provided to permit the lower strap 42 to move laterally. By providing the upper strap slot assembly 48 and the lower strap slide 52, the harness assembly 38 and occupant are permitted to move laterally toward one of the two side wall portions 24 under lateral deceleration forces. However, the harness assembly 38 is configured to prevent any outward movement of the infant away from the shell assembly 14. Thus, the infant is restrained against outward movement away from the shell assembly 14 by the harness assembly 38, however limited lateral movement of the infant is permitted by the sliding feature of the harness assembly 38. More specific details to the structure of the sliding harness assembly 38 will be described below in the discussion related to FIGS. 6–8.

A pivot arrangement 56 is provided to pivotally attach the upper shell portion 22 to the lower shell portion 20. This pivot arrangement 56 permits the upper shell portion 22 to be pivoted away from the generally planar configuration shown in FIG. 1 to the angled configuration shown in FIG. 2. Again, by permitting the upper shell portion 22 to be pivoted away from the planar configuration shown in FIG. 1, the shell assembly 14 can be positioned to an angled orientation as shown in FIG. 2 to permit the device 10 to be used as a standard rear-facing car seat for infants once the infant has grown beyond the size where the car bed configuration (FIG. 1) can be used safely. Illustratively, it has been found that the device 10 can be utilized in the car bed configuration as illustrated in FIG. 1 for infants from birth up to approximately 12–14 pounds in weight. Additionally, the device 10 can be used in the car bed configuration for low birth weight infants who weigh as little as 4¾ pounds. The device 10 can be utilized in the angled configuration illustrated in FIG. 2 as a standard rear-facing car seat for infants up to 20 pounds in weight.

Recesses 60 are provided in the lower shell portion 20 to receive a standard vehicle seat belt 62. As shown in FIG. 1, the proper positioning of the device 10 when in a car bed configuration is with the head portion 23 of the shell assembly 14 oriented toward the center of the motor vehicle (not shown). The vehicle seat belt 62 is then routed through the recess 60 closest to the seat back, across the lower portion of the infant, through the opposite recess 60, and then beneath the lower shell portion 20 and upper shell portion 22 and then attached in a normal manner to the opposite end of the seat belt 62.

A curved handle 66 is provided which pivots on pins 68 located in the upper shell portion 22. The handle 66 is adjustably moveable to act as either a carrying handle or as a rocking support for the shell assembly 14, if desired. The mechanism for adjustably moving the handle 66 will be discussed later in the discussion related to FIG. 4. In general, it will be understood that the handle 66 can be oriented upwardly to serve as a handle to carry the shell assembly 14 when in both the car bed configuration and the angled seat configuration.

FIG. 2 shows the convertible infant restraint device 10 configured as a standard rear-facing car seat. Specifically, the upper shell portion 22 has been pivoted about the pivot arrangement 56 to form the angled orientation shown in FIG. 2. The details of the pivot arrangement will be discussed later in the discussion related to FIG. 5. In the angled configuration shown in FIG. 2, the base portion 26 of the lower shell portion 20 serves as a support for the entire shell assembly 14. As discussed above, the harness assembly 38 functions to properly restrain the infant from movement away from the shell assembly 14, but permits lateral movement when the infant is exposed to lateral deceleration forces without any adjustment from the configuration shown in FIG. 1. The device 10 is secured to the motor vehicle seat 12 by routing the seat belt 62 through the two recesses 60 in a conventional manner. In the preferred embodiment, the device 10 must only be used as a rear-facing seat when in the angled configuration. As can be seen, the lower support surface 32 is angled somewhat to serve as a seat for the infant in the angled configuration. The change in configuration and placement of the lower support surface 32 between the configuration illustrated in FIG. 1 and the configuration illustrated in FIG. 2 occurs automatically upon pivoting of the upper shell portion 22. This reorientation of the lower support surface 32 upon movement of the upper shell portion 22 will be discussed below in the discussion related to FIGS. 3 and 4. Again, in the angled configuration, the device 10 can be utilized with infants up to a weight of approximately 20 pounds.

Figure 3:
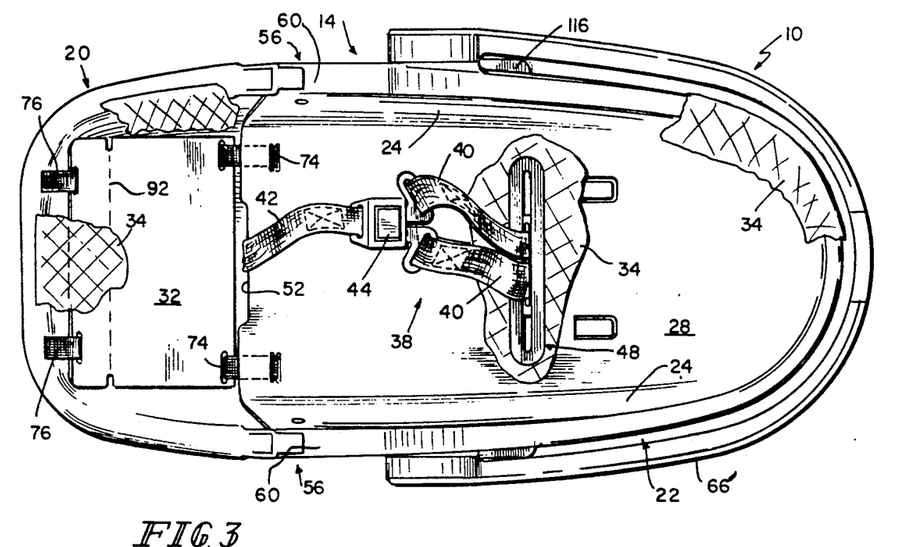
FIG. 3 is a top plan view of FIG. 1 with portions of the cover removed for clarity.

FIG. 3 shows in greater detail the arrangement of the harness assembly 38, and also the structure of the lower support surface 32, and its connection to the upper support surface 28. Specifically, the lower support surface 32 is flexibly coupled to the upper support surface 28 by flexible straps 74. The bottom end of the lower support surface 32 is attached to the lower shell portion 20 by flexible straps 76. A space is created between the lower support surface 32 and the upper support surface 28 to form the lower strap slide area 52.

Figure 4:
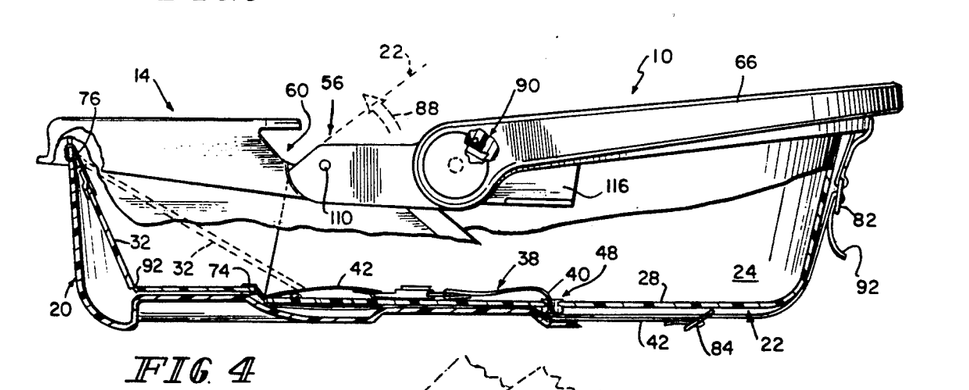
FIG. 4 is a side elevational view of FIG. 3 with the lower portion broken away.

FIG. 4 illustrates the routing and configuration of the harness assembly 38, and also illustrates in dotted line the repositioning of the lower support surface 32 when the upper shell portion 28 is moved to the angled orientation to form the standard rear-facing seat assembly. Specifically, when the upper shell portion 22 is rotated in the direction of arrow 88, the upper support surface 28 moves the lower support surface 32 through the flexible straps 74 to the orientation illustrated in dotted line. In this configuration, the lower support surface 32 forms a seat area for the infant which is necessary when the device 10 is in the angled orientation. When the device 10 is in the planar configuration illustrated in FIG. 4 in solid line, the lower support surface 32 is an angled member, with the angle created by a flexible portion 92 formed in the lower support surface 32. When the upper shell portion 22 is rotated in the direction of arrow 88 to the angled orientation illustrated in FIG. 2, the upper support surface 28 pulls the lower support surface 32 to a straight orientation by the straps 74 because of the movement of the upper support surface 28 away from the lower shell portion 20. When the upper shell portion 22 is locked in the angled orientation, the lower support surface 32 will be held in the straight orientation as shown in dotted line to form the seat for the infant.

The harness assembly 38 is a single adjustment arrangement which provides for easy adjustment of the assembly 38 by simply adjusting the length of the shoulder straps 40 by the use of a combined adjustment buckle 82. The lower strap 42 is attached to the shoulder straps 40 in a piggy-back arrangement and thus moves in unison with the shoulder straps 40. The position of the lower strap 42 with respect to the shoulder straps 40 can be adjusted using a lower strap adjustment buckle 84. Thus, when the infant is placed in the shell assembly 14, the first adjustment is the proper placement of the lower strap 42, and particularly the proper location of the harness buckle 44. This adjustment is made by adjusting the length of the lower strap 42 using the lower strap adjustment buckle 84. Once this adjustment has been properly made, the overall tightness of the harness assembly 38 is adjusted by lengthening or shortening the shoulder straps 40 using the combined adjustment buckle 82. As can be seen in FIG. 4, tightening the shoulder straps 40 using the combined adjustment buckle 82 will also tighten the lower strap 42 simultaneously. Conversely, loosening the shoulder straps 40 through the combined adjustment buckle 82 will simultaneously loosen the lower strap 42. Thus, accurate adjustments of the harness assembly 38 can be made to both the lower strap 42 and the shoulder straps 40 simultaneously, which greatly simplifies the adjustment of the harness assembly 38 to the proper configuration to properly restrain the infant within the shell assembly 14. FIG. 4 also shows the attachment of the handle 66 to the upper shell portion 22. Specifically, the handle 66 is attached to the upper shell portion 22 by a tooth arrangement 90 which permits selective angular adjustment of the handle 66 to any desired position.

Figure 5:
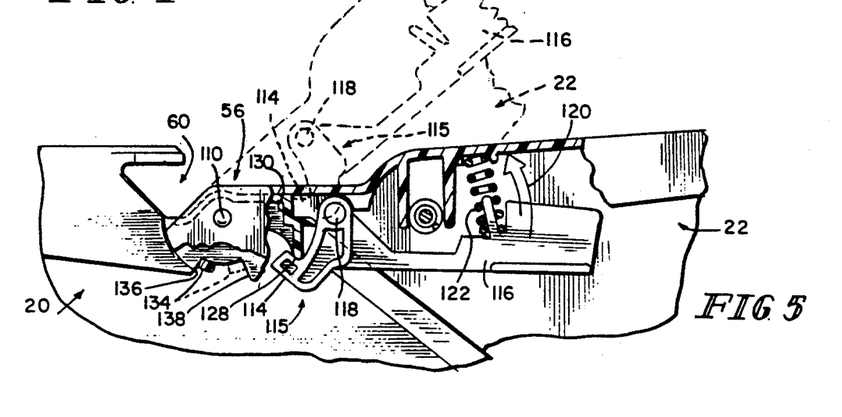
FIG. 5 is an enlarged portion of FIG. 4 with portions broken away to illustrate the structure of the latch assembly.

FIG. 5 illustrates the locking mechanism 115 for locking the upper shell portion 22 in one of the two orientations with respect to the lower shell portion 20. The pivot arrangement 56 includes a pivot pin 110 about which the upper shell portion 22 pivots with respect to the lower shell portion 20. A locking pawl 114 is provided which is attached to a lever arm 116 to lock the upper shell portion 22 in either the planar configuration (shown in solid lines) or the angled configuration (shown in dotted lines). The lever 116 pivots about a pivot 118 and is moveable in the direction of arrow 120 against a resilient spring force provided by a spring 122. Thus, the spring 122 acts to keep the lever 116 in its lower position as illustrated in FIG. 5. With the upper shell portion 22 in its lowered position to form the planar configuration of the shell assembly 14, the locking pawl 114 cooperates with a downwardly extending finger 128 to lock the upper shell portion 22 in this planar configuration. The biasing force provided by the spring 122 acts to maintain the pawl 114 in the locked position.

To rotate the upper shell portion 22 upwardly toward the angled orientation, the operator first squeezes the lever 116 in the direction of arrow 120 against the resilient force of the spring 122. This unlocks the locking pawl 114 from the downwardly extending finger 128. The upper shell portion 22 is then manually moved upwardly toward the angled position illustrated in dotted line. When the upper shell portion 22 reaches the proper position, the lever 116 is released, and the locking pawl 114 is forced into a locking notch 130 which is formed in the lower shell portion 20 above the downwardly extending finger 128. The spring 122 acts to both force the locking pawl 114 into the notch 130, and to retain the pawl 114 in the notch 130 after the lever 116 has been released.

To ensure that the upper shell portion 22 is not rotated beyond its proper angled position as shown in dotted line, an outwardly extending arm 134 is provided which is attached to the upper shell portion 22 and which travels between a first shoulder 136 and a second shoulder 138. With the arm 134 butted against the first shoulder 136, any further downward movement of the upper shell portion 22 is prevented. As the upper shell portion 22 is rotated toward the angled orientation illustrated in dotted line, the movement is limited by the position of the second shoulder 138. Specifically, the second shoulder 138 acts to limit the movement of the arm 134 such that any further upward movement of the upper shell portion 22 beyond the desired position is prevented. The position of the arm 134 when the upper shell portion 22 is rotated to the proper angled orientation is shown in dotted line. It will be understood that, although only one locking mechanism 115 is shown in FIG. 5, in the preferred embodiment there are two locking mechanisms 115, one on either side of the shell assembly 14.

Figure 6:
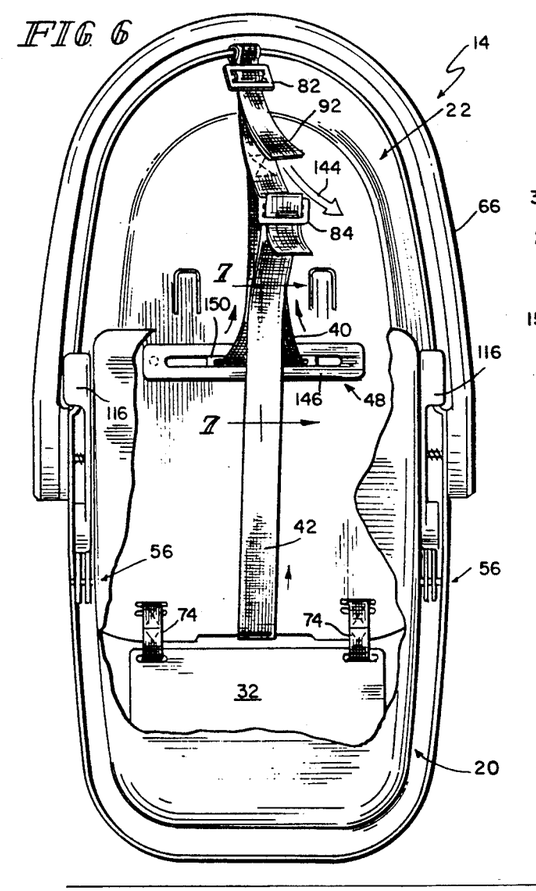
FIG. 6 is a bottom view of FIG. 1 with portions broken away illustrating the harness assembly and its adjustment features.

FIG. 6 shows in greater detail the arrangement of the harness assembly 38 and its adjustment features, and also shows further details of the sliding features of the harness assembly 38. As discussed above, the harness assembly 38 includes a single strap adjustment feature which permits adjustment of both of the lower strap 42 and the shoulder straps 40 by a single adjustment, with both the lower strap 42 and shoulder straps 40 being moved simultaneously. Specifically, as the shoulder straps 40 are shortened by pulling on the end 92 in the direction of arrow 144, both the shoulder straps 40 and the lower strap 42 are shortened. Again, this single adjustment feature provides for easy adjustment of the harness assembly 38 after the infant has been placed in the shell assembly 14. To permit the shoulder straps 40 to move laterally, a back plate 146 is attached to the underneath side of the upper support surface 28. The slot 48 is formed by this back plate 146. The function of the back plate 146 will be discussed in greater detail below in the discussion related to FIGS. 7 and 8.

Figure 7:
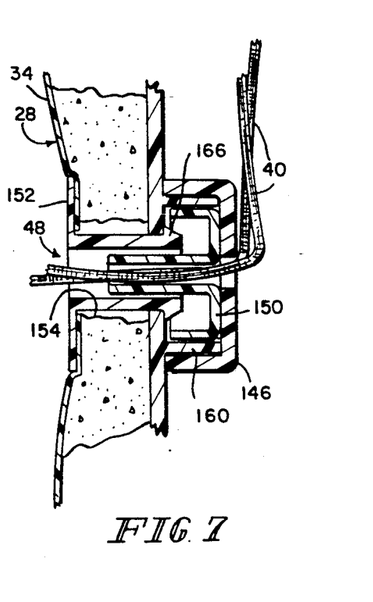
FIG. 7 is a sectional view taken along lines 7—7 of FIG. 6 illustrating the harness slide assembly.

FIG. 7 shows in greater detail the attachment of the back plate 146 to the upper support surface 28, and the routing of the shoulder straps 40 through the slot assembly 48. A movable strap slide 150 is provided through which the shoulder straps 40 are routed and retained. The strap slide 150 is captured for movement between the back plate 146 and a track 160 which is formed as a part of the underneath side of the upper support surface 28. The strap slide 150 permits the shoulder straps 40 to move laterally, while still maintaining the proper placement of the shoulder straps 40 around the infant. It will be understood that, in the absence of the strap slide 150, the shoulder straps 40 could become tangled or otherwise misaligned while moving in the slot assembly 48. A front locking plate 152 is provided which is placed in a hole 154 in the upper support surface 28 and which engages the track 160. Thus, the front locking plate 152, the track 160, and the strap slide 150 cooperate to form the slot assembly 48. The front locking plate 152 includes elongated, spaced-apart projections which terminate in locking ribs 166. These locking ribs 166 snap into place in the track 160 after the front locking plate 152 has been inserted through the hole 154. The locking ribs 166 thus act to both properly position the front locking plate 152, and to retain the locking plate 152 in the proper position and orientation.

Figure 8:
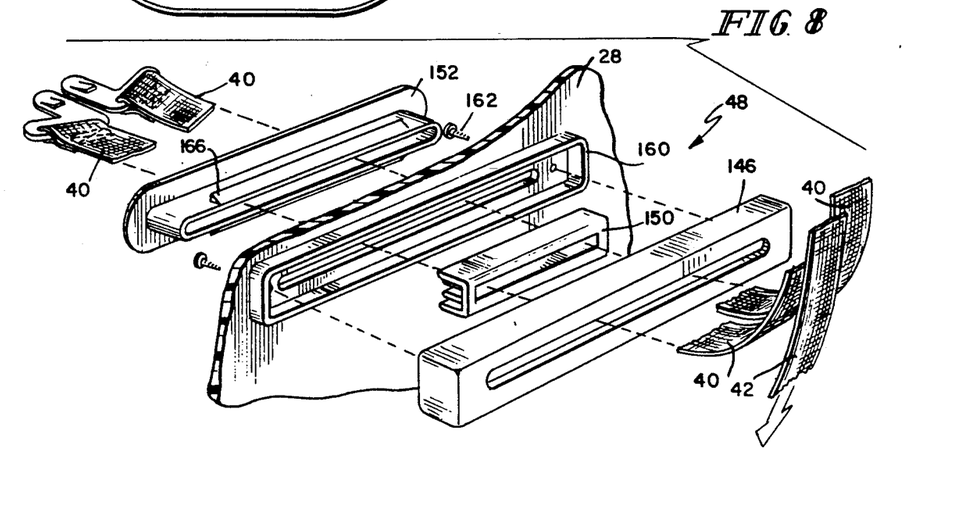
FIG. 8 is an exploded perspective view of the harness slide assembly.

FIG. 8 shows in still greater detail the orientation of the front locking plate 152, the track 160, the strap slide 150, and the back plate 146. FIG. 8 shows that the back plate 146 is attached to the upper support surface 28 by screws 162. The strap slide 150 is captured between the track 160 and the back plate 146. After the back plate 146 has been attached to the upper support surface 28 by the screws 162, the front locking plate 152 is inserted through the hole 154, with the locking ribs 166 engaging the track 160 to properly position the front locking plate 152. With the shoulder straps 40 routed through the back plate 146, the strap slide 150, the track 160, and the front locking plate 152, controlled lateral movement of the shoulder straps 40 upon lateral deceleration forces is permitted.

Thus, the infant restraint device functions both as an infant car bed for infants under approximately 14 pounds in weight, and for medically fragile infants, and which also converts to a standard rear-facing car seat for older infants. The device includes a floating or moving restraint system. By permitting the device to be converted from an infant car bed to a standard rear-facing seat, the device can be used for a much longer period of time than a conventional car bed. Further, with the handle 66, the device can be used as carrier for transporting the child outside the vehicle.

Figure 9:
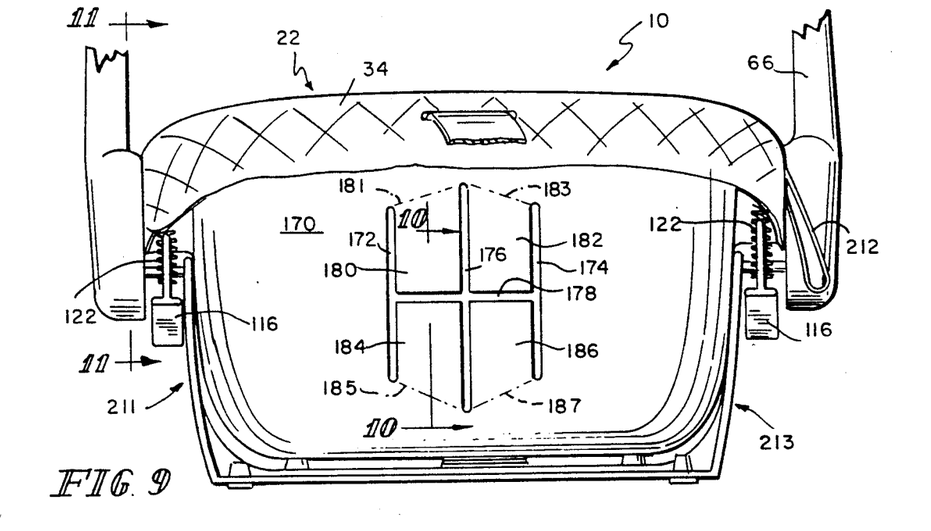
FIG. 9 is an end elevational view of another embodiment of an infant restraint device illustrating yieldable sections formed in a generally rigid end wall of the device.

Another aspect of the invention is shown in FIG. 9. The upper shell portion 22 of the restraint device 10 includes a generally rigid end wall 170. The end wall 170 is formed to include three vertical slots 172, 174, and 176. The center vertical slot 176 is slightly longer than the side vertical slots 172 and 174. End wall 170 is also formed to include a horizontal slot 178 which interconnects the three vertical slots 172, 174, and 176. The horizontal slot 178 is located substantially in the center of vertical slots 172, 174, and 176.

The vertical slots 172, 174, and 176 and the horizontal slot 178 are configured to define four yieldable sections 180, 182, 184, and 186 in end wall 170. Yieldable sections 180, 182, 184, and 186 each provide a cantilevered member movable about an axis connecting end portions of the vertical slots 172, 174, and 176 upon the application of a force in the direction of arrow 188 shown in FIG. 10 against end wall 170. Such a force might result from an occupant bumping against the end wall following a jolt to the infant restraint device. Cantilevered upper yieldable section 180 is movable about axis 181. Cantilevered upper yieldable section 182 is movable about axis 183. Cantilevered lower yieldable section 184 is movable about axis 185. Cantilevered yieldable section 186 is movable about axis 187.

Figures 10, 11, 12:
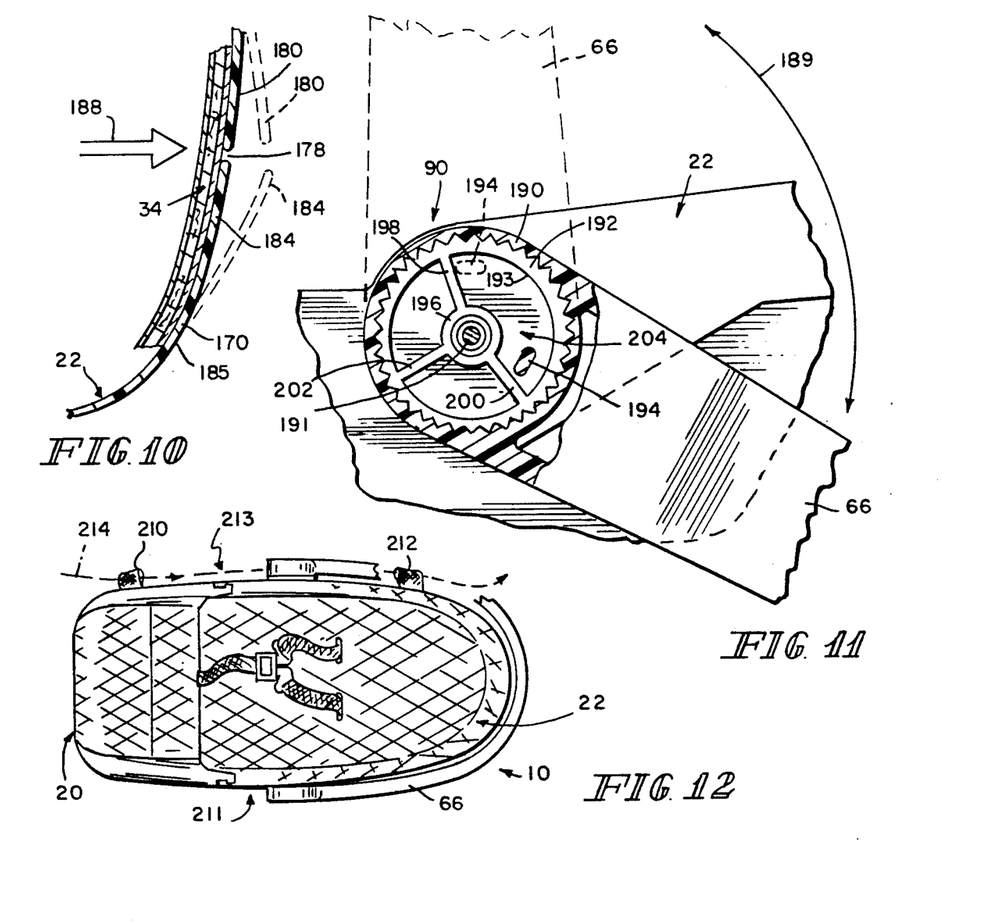
FIG. 10 is a sectional view taken along lines 10—10 of FIG. 9 illustrating movement of the yieldable sections away from the end wall upon the application of a force against the end wall.
FIG. 11 is sectional view taken along lines 11—11 of FIG. 9 illustrating a stop mechanism for limiting the range of movement of the handle relative to the upper shell portion.
FIG. 12 is a top view of the restraint device illustrating the position of two seatbelt-receiving loops connected to the lower and upper shell portions.

As best shown in FIG. 10, when a force is applied to end wall 170 in the direction of arrow 188, yieldable sections 180, 182, 184, and 186 move away from end wall 170 to dissipate the force against end wall 170. Because center vertical slot 176 is slightly longer than side slots 172 and 174, the yieldable sections 180 and 184 move slightly in the direction of side wall 211 of upper shell portion 22 upon the application of a force in the direction of arrow 188. Yieldable sections 182 and 186 move slightly in the direction of side 213 of upper shell portion 22 when a force is applied. This prevents the yieldable sections 180, 182, 184, and 186 from colliding with each other upon movement away from end wall 170.

Yet another aspect of the present invention is shown in FIG. 11. The handle 66 attached to upper shell portion 22 is rotatable about a pivot pin 191 between the first predetermined angular limit position shown in phantom in FIG. 11 to the second predetermined angular limit position indicated by the solid-line position of handle 66 in FIG. 11. In the first position, handle 66 can be used to carry the basket-like infant restraint device to transport a child away from the vehicle.

The handle 66 is movable in the direction of arrow 189 between a continuum of angular positions from the first position to second position. Tooth arrangement 90 provides means for adjusting the angular position of the handle 66 relative to the upper shell portion 22. Tooth arrangement 90 includes a plurality of teeth 190 formed in the handle 66, and a plurality of teeth 192 formed on the upper shell portion 22. The teeth 190 and 192 can be mated in a plurality of positions to align the handle 66 in a plurality of angular positions between the first position and the second position.

Upper shell portion 22 is formed to include a ring 196 surrounding pivot pin 191. Ribs 198, 200, and 202 extend radially outwardly between the ring 196 and the inner side wall 193 of section 192. The first rib 198 and the second rib 200 are spaced apart to define a space 204 therebetween. The third rib 202 provides additional stability to the tooth arrangement 90.

A blocking member 194 is coupled to handle 66. Blocking member 194 is aimed to project toward the upper shell portion 22 and to lie within the space 204. Blocking member 194 is movable relative to the upper shell portion 22 along an arc located within the space 204 as the handle 66 is rotated relative to upper shell portion 22. Blocking member 194 is movable from a first predetermined angular position abutting first rib 198 to define the first limit position of handle 66 to a second position abutting second rib 200 to define the second predetermined angular limit position of handle 66. The first and second ribs 198 and 200 combined with blocking member 194 provide stop means for blocking movement of the handle to prevent angular movement of the handle beyond the first or the second predetermined angular limit positions shown in FIG. 11.

Still another aspect of the present invention is shown in FIG. 12. The restraint device 10 includes a first loop 210 coupled to the lower shell portion 20 and a second loop 212 coupled to the upper shell portion 22. To install the device 10 situated in the planar orientation in a vehicle, a seat belt is inserted in the direction of arrow 214 through the first loop 210 and the second loop 212. The position of loop 212 is shown best in FIG. 9. The first and second loops 210 and 212 position and hold the seat belt on the side wall 213 of lower and upper shell portions 20 and 22 so that the device 10 can be coupled to a seat of the vehicle. While installed in the vehicle, the first side wall 211 of the device 10 is situated against the back of the seat.

Figure 13:
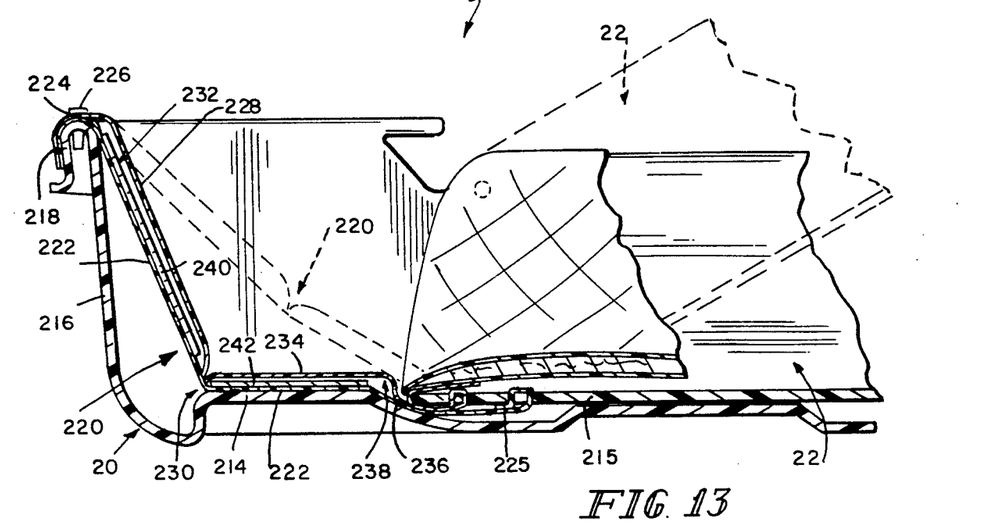
FIG. 13 is a sectional view of the infant restraint device showing folding movement of upper and lower pads in the lower shell to provide a chair seat or a foot rest for an infant carried therein.

Another embodiment of the lower support surface of the device 10 is shown in FIG. 13. In this embodiment, a foldable lower support member or seat 220 is provided. Lower shell portion 20 includes a bottom surface 214, end wall 216, and an upper flange 218. Upper shell portion 22 includes a bottom surface 215 overlapping bottom surface 214 of lower shell portion 20.

Foldable support member 220 includes a first sheet of material 222 including a first end coupled to the upper flange 218 of end wall 216 of lower shell portion by a suitable fastener 226. A second end of the first sheet of material 222 is connected to the bottom surface 215 of upper shell portion 22 at location 225.

Foldable support member 220 also includes a second sheet of material 228 having a first end coupled to the first end of the first sheet 222 on flange 218. A second end of the second sheet 228 is coupled to a middle portion 230 of the first sheet 222 to define a first space 232 between the first and second sheets 220 and 228. Foldable support member 220 also includes a third sheet of material 234 having a first end coupled to the middle portion 230 of the first sheet 222 spaced apart from the second end of second sheet 228. A second end of the third sheet 234 is coupled to the second end of the first sheet of material 222 at location 236 to define a second space 238 between the first and third sheets 222 and 234. Padding material is situated inside the first space 232 and the second space 238 to provide a lower pad 240 and an upper pad 242, respectively The upper pad 242 is appended to the lower pad 240 along an edge thereof defined by the middle portion 230 of first sheet 222.

When the upper and lower shell portions 22 and 20 are in the first generally planar orientation shown in FIG. 13, the upper pad 242 rests against the bottom surface 214 of lower shell portion 20 to provide a portion of the flat bed. When the upper shell portion 22 is moved to the second angular (dotted) position shown in FIG. 13, the foldable support member 220 moves to a generally planar orientation to provide a seat for the chair. As the upper shell portion 22 returns to its generally planar orientation, the support member 220 folds along its edge 230 to collapse and provide the flat bed.

Figure 14:
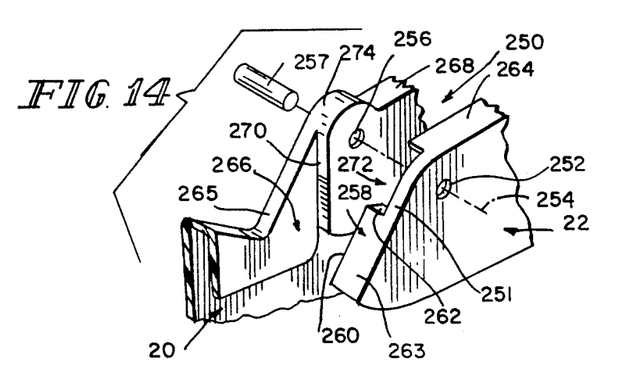
FIG. 14 is a perspective view of a pivot mechanism for connecting the upper shell portion to the lower shell portion.

In another embodiment of the pivot arrangement of the present invention, an assembly 250 is provided to limit the range of angular movement of the upper shell portion 22 relative to the lower shell portion 20. Upper shell portion 22 includes an aperture 252, and lower shell portion 20 includes an aperture 256. A pivot pin 257 is inserted through the apertures 252 and 256 to define an axis rotation 254 of the upper shell portion 22 relative to the lower shell portion 20.

Upper shell portion 22 includes an end edge 251 and a shoulder portion 258 coupled to the end edge 251. The shoulder portion 258 is aimed to project toward the lower shell portion 20. Shoulder 258 includes an inner edge 260, an upper surface 263, a top edge 262, and an engaging surface 261. Upper shell portion 22 also includes a top flange 264 situated over a portion 268 of lower shell portion 20. Upper shell further includes a notch 272 for receiving a curved portion 274 of lower shell portion 20. Lower shell portion 20 includes a blocking wall 270 and a sliding surface 266.

Figure 15:
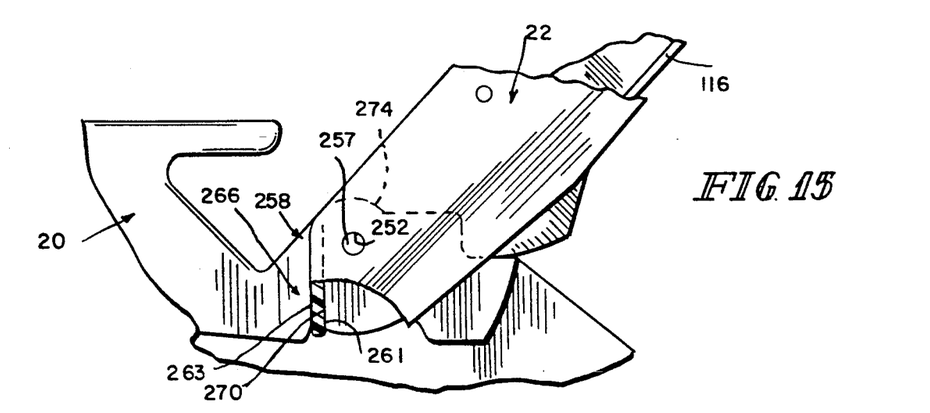
FIG. 15 is an elevational view of the pivot mechanism shown in FIG. 14 with portions broken away illustrating the position of a blocking wall formed on the lower shell portion and a shoulder formed on the upper shell portion.

As is best shown in FIG. 15, blocking wall 270 engages surface 261 of shoulder 258 when the upper shell portion 22 and the lower shell portion 20 are in the second angular position. This engagement prevents the upper shell portion 22 from moving relative to the lower shell portion 20 beyond the second predetermined angular position As the upper shell portion 22 moves from the second angular position to the first generally planar position, inner edge 260 of shoulder 258 slides along sliding surface 266 of lower shell portion 20. Sliding surface 266 abuts the inner edge 260 to prevent misalignment of the upper shell portion 22 relative to the lower shell portion 20. When the upper shell portion 22 and the lower shell portion 20 are in the generally planar orientation, upper surface 263 is aligned generally evenly with the edge 265 of lower shell portion 20.

Although the invention has been described in detail with reference to a preferred embodiment and specific examples, variations and modifications exist within the scope and spirit of the invention as defined in the following claims.

What is claimed is:

1. A restraint device for securing and supporting an infant, the device comprising a shell assembly formed to include a chamber sized to receive the infant, the shell assembly including first and second spaced apart side walls and a generally rigid end wall defining a boundary of the chamber, the rigid end wall being configured to lie generally in a plane and the rigid wall being formed to include a slot arranged in a predetermined pattern to define a yieldable section movable between a fixed first position in the plane of the rigid end wall and a yielded second position outside the plane of the rigid end wall in response to a force acting against the yieldable section of the rigid end wall, the rigid end wall and the yieldable section being formed from a single piece of material.

2. The device of claim 1, wherein the end wall is formed to include a slot defining a perimeter of the yieldable section.

3. The device of claim 1, wherein the yieldable section includes a cantilevered member having a first end securely fixed to the end wall and a second unattached end, the cantilevered member being pivotable about its first end in response to the force acting against the end wall.

4. The device of claim 1, further comprising a handle rotatably coupled to the shell assembly for movement relative to the shell assembly in first and second directions about an axis of rotation between a continuum of angular positions, means for adjusting the angular position of the handle relative to the shell assembly, and stop means for blocking movement of the handle to limit the range of movement of the handle relative to the shell assembly between a first predetermined angular position and a second predetermined angular position.

5. The device of claim 1, wherein the shell assembly includes a lower shell portion and an upper shell portion, the device further comprising means for pivotably connecting the upper shell portion to the lower shell portion for movement between a first generally planar orientation in which the lower and upper shell portions are aligned in a longitudinally extending end-to-end relation to provide a flat bed and a second angular orientation in which the lower and upper shell portions are aligned at an angle with respect to one another to provide a chair, and a foldable support member including an upper pad coupled to the upper shell portion and a lower pad appended to the upper pad along an edge thereof, the lower pad being coupled to the lower shell portion, whereby the upper and lower pads fold along the edge in response to movement of the upper and lower shell portions from the second angular orientation to the first generally planar orientation.

6. The device of claim 1, wherein the shell assembly includes an upper shell portion configured to support an upper portion of an infant and a lower shell portion configured to support a lower portion of an infant, the device further comprising coupling means for pivotably coupling the upper shell portion to the lower shell portion to permit the upper shell portion to be movable relative to the lower shell portion between a first generally planar orientation and a second angular orientation, a shoulder portion coupled to the upper shell portion and configured to extend toward the lower shell portion, the shoulder portion being movable relative to the lower shell portion upon pivotal movement of the upper and lower shell portions, and a blocking wall formed on the lower shell portion and positioned to engage the shoulder portion during relative movement of the lower and upper shell portions to block pivotal movement of the upper shell portion relative to the lower shell portion beyond the second angular orientation.

7. The device of claim 1, wherein the shell assembly includes an upper shell portion configured to support an upper portion of an infant and a lower shell portion configured to support a lower portion of an infant, the shell assembly being configured to be secured to a seat inside a vehicle by a seat belt, the device further comprising coupling means for pivotably coupling the upper shell portion to the lower shell portion to permit the upper shell portion to be movable relative to the lower shell portion between a first and generally planar orientation and a second angular orientation, a first loop configured to receive the seat belt therethrough coupled to the lower shell portion, and a second loop configured to receive the seal belt therethrough coupled to the upper shell portion spaced apart form the first loop, the first and second loops configured to position and hold the seal belt on the shell assembly to secure the shell assembly to the seat.

8. A restraint device for securing and supporting an infant, the device comprising
- a shell assembly formed to include a chamber sized to receive the infant, the shell assembly including first and second spaced apart side walls and a generally rigid end wall defining a boundary of the chamber, the rigid end wall including a yieldable section movable between a fixed first position and a yielded second position in response to a force acting against the yieldable section of the rigid end wall, the rigid end wall and the yieldable section being formed from a single piece of material, wherein the end wall is formed to include three spaced apart, substantially parallel slots and a fourth slot generally perpendicular to the three substantially parallel slots, the fourth slot interconnecting the three vertical slots to define two upper cantilevered yieldable sections and two lower cantilevered yieldable sections in the end wall.

9. A restraint device for securing and supporting an infant, the device comprising
- an upper shell portion,
- a lower shell portion,
- means for pivotably connecting the upper shell portion to the lower shell portion to permit movement of the upper shell portion relative to the lower shell portion between a first generally planar orientation and a second angular orientation, the connected upper and lower shell portions defining a chamber sized to receive the infant,
- a foldable seal including a lower pad and an upper pad coupled to the lower pad along an edge thereof, the foldable seat being situated inside the chamber adjacent to the lower shell portion to provide means for supporting a lower portion of the infant, the foldable seat including a first sheet of material having a first end appended to the lower shell portion, a second end appended to the upper shell portion, and a middle portion located between the first and second ends, the foldable seat including a second sheet of material having a first end coupled to the first end of the first sheet of material and a second end coupled to the middle portion of the first sheet of material to define a first space between the first and second sheets of material, the foldable seat also including a third sheet of material having a first end connected to the middle portion of the first sheet of material spaced apart from the second end of the second sheet of material to define the edge of the foldable seat therebetween and a second end connected to the second end of the first sheet of material to define a second space between the first and third sheets of material, and the foldable seat further including a padding material situated in the first and second spaces to define the lower and upper pads of the foldable seat, respectively,
- first coupling means for coupling the lower pad to the lower shell portion, and
- second coupling means for coupling the upper pad to the upper shell portion, the foldable seat being configured to provide a generally planar seat when the upper shell portion is in the second angular orientation, the foldable seat folding along its edge in response to movement of the upper shell portion relative to the lower shell portion from the second angular orientation to the first generally planar orientation.

10. A restraint device for securing and supporting an infant, the device comprising
- a shell assembly including lower and upper shell portions, the lower shell portion including a bottom surface and an end wall having an upper edge and the upper shell portion including a bottom surface overlapping the bottom surface of the lower shell portion,
- means for pivotably connecting the upper shell portion to the lower shell portion for movement between a first generally planar orientation in which the lower and upper shell portions are aligned in longitudinally extending end-to-end relation to provide a flat bed and a second angular orientation in which the lower and upper shell portions are aligned at an angle with respect to one another to provide a chair, and
- a foldable support member including an upper pad coupled to the bottom surface of the upper shell portion and a lower pad appended to the upper pad along an edge thereof, the lower pad being coupled to the upper edge of the end wall of the lower shell portion, whereby the upper and lower pads fold along the edge in response to movement of the upper and lower shell portions from the second angular orientation to the first generally planar orientation.

11. The device of claim 10, wherein the foldable support member includes a first sheet of material having a first end appended to the lower shell portion, a second end appended to the upper shell portion, and a middle portion, the foldable support member including a second sheet of material having a first end coupled to the first end of the first sheet of material and a second end coupled to the middle portion of the first sheet of material to define a first space between the first and second sheets of material, the foldable support member also a third sheet of material having including a first end coupled to the middle portion of the first sheet of material spaced apart from the second end of the second sheet of material to define the edge of the foldable support member therebetween, and a second end coupled to the second end of the first sheet of material to define a second space between the first and third sheets of material, the foldable support member further including a padding material situated inside the first and second spaces to define the lower and upper pads, respectively.

12. The device of claim 10, wherein the upper shell portion includes a generally rigid end wall defining a boundary of the shell assembly and a yieldable section formed in the end wall, the yieldable section being movable relative to the end wall in response to a force acting against the end wall.

13. The device of claim 10, further comprising a handle rotatably coupled to the upper shell portion of the shell assembly for movement relative to the shell assembly in first and second directions about an axis of rotation between a continuum of angular positions, means for adjusting the angular position of the handle relative to the shell assembly, and stop means for blocking movement of the handle to limit the range of movement of the handle relative to the shell assembly between a first predetermined angular position and a second predetermined angular position.

14. The device of claim 10, further comprising a first loop configured to receive a seat belt therethrough, the first loop being coupled to the lower shell portion, and a second loop being configured to receive the seal belt therethrough, the second loop being coupled to the upper shell portion spaced apart from the first loop, the first and second loops configured to position and hold the seat belt on the shell assembly to secure the shell assembly to a seat inside a vehicle.

15. A restraint device for securing and supporting an infant, the device comprising a shell assembly including lower and upper shell portions, means for pivotably connecting the upper shell portion to the lower shell portion for movement between a first generally planar orientation in which the lower and upper shell portions are aligned in longitudinally extending end-to-end relation to provide a flat bed and a second angular orientation in which the lower and upper shell portions are aligned at an angle with respect to one another to provide a chair, a foldable support member including an upper pad coupled to the upper shell portion and a lower pad appended to the upper pad along an edge thereof, the lower pad being coupled to the lower shell portion, whereby the upper and lower pads fold along the edge in response to movement of the upper and lower shell portions from the second angular orientation to the first generally planar orientation, a shoulder portion coupled to the upper shell portion and configured to extend toward the lower shell portion, the shoulder portion being movable relative to the lower shell portion upon pivotal movement of the upper shell portion and the lower shell portion, and a blocking wall formed in the lower shell portion and positioned to engage the shoulder portion during relative movement of the lower and upper shell portions to block pivotal movement of the upper shell portion relative to the lower shell portion beyond the second angular orientation.

16. A restraint device for securing and supporting an infant, the device comprising a shell assembly including an upper shell having an upper end and a lower end portion configured to support and upper portion of an infant and a lower shell having an upper end and a lower end portion configured to support a lower portion of an infant, coupling means for pivotably coupling the lower end of the upper shell portion to the upper end of the lower shell portion to permit the upper shell portion to be movable relative to the lower portion along a continuum of angular positions between a first generally planar orientation and a second angular orientation, first means formed on the upper shell portion and second means formed on the lower shell portion, the first and second means being configured to provide means for blocking movement of the upper shell portion relative to the lower shell portion beyond a predetermined angular position, the first means including a shoulder portion coupled to the upper shell portion and configured to extend inwardly toward the lower shell portion and including an engaging surface facing the upper end of the upper shell portion, the shoulder portion being movable relative to the lower shell portion upon pivotal movement of the upper shell portion and the lower shell portion, and means for concealing the blocking means for all angular positions of the upper shell portion relative to the lower shell portion, the second means including a blocking wall formed on the lower shell portion and configured to extend outwardly toward the upper shell portion, the blocking wall having a surface facing the lower end of the lower shell portion to engage the engaging surface of the shoulder portion during relative movement of the lower and upper shell portions to block pivotal movement of the upper shell portion relative to the lower shell portion beyond the second angular position.

17. The device of claim 16, wherein the shoulder portion includes an inner edge movable along a predetermined arc as the upper shell portion and the lower shell portion move between the first and second orientations, the lower shell portion including a sliding surface configured to abut the inner edge of the shoulder during relative movement of the upper and lower shell portions to maintain proper alignment between the upper and lower shell portions.

18. The device of claim 16, wherein the upper shell portion includes a generally rigid end wall defining a boundary of the shell assembly and a yieldable section formed in the end wall, the yieldable section being movable relative to the end wall in response to a force acting against the end wall.

19. The device of claim 16, further comprising a handle rotatably coupled to the upper shell portion of the shell assembly for movement relative to the shell assembly in first and second directions about an axis of rotation between a continuum of angular positions, means for adjusting the angular position of the handle relative to the shell assembly, and stop means for blocking movement of the handle to limit the range of movement of the handle relative to the shell assembly between a first predetermined angular position and a second predetermined angular position.

20. The device of claim 16, further comprising a first loop configured to receive a seat belt therethrough, the first loop being coupled to the lower shell portion, and a second loop configured to receive the seat belt therethrough, the second loop being coupled to the upper shell portion spaced apart from the first loop, the first and second loops configured to position and hold the seat belt on the shell assembly to secure the shell assembly to a vehicle seat.

21. A restraint device for securing and supporting an infant, the device comprising a shell assembly including an upper shell portion configured to support an upper portion of an infant and a lower shell portion configured to support a lower portion of an infant, coupling means for pivotably coupling the upper shell portion to the lower shell portion to permit the upper shell portion to be movable relative to the lower portion between a first generally planar orientation and a second angular orientation, a shoulder portion coupled to the upper shell portion and configured to extend toward the lower shell portion, the shoulder portion being movable relative to the lower shell portion upon pivotal movement of the upper shell portion and the lower shell portion, a blocking wall formed on the lower shell portion and positioned to engage the shoulder portion during relative movement of the lower and upper shell portions to block pivotal movement of the upper shell portion relative to the lower shell portion beyond the second angular orientation, and a foldable support member including an upper pad coupled to the upper shell portion and a lower pad appended to the upper pad along an edge thereof, the lower pad being coupled to the lower shell portion, whereby the upper and lower pads fold along the edge in response to movement of the upper and lower shell portions from the second angular orientation to the first generally planar orientation.

22. A restraint device for securing and supporting an infant, the device comprising a shell assembly including an upper shell portion configured to support an upper portion of an infant and a lower shell portion configured to support a lower portion of an infant, the upper shell portion including generally rigid end wall defining a boundary of the shell assembly and a yieldable section formed in the end wall, the yieldable section being movable relative to the end wall in response to a force acting against the end wall, a handle rotatably coupled to the upper shell portion of the shell assembly for movement relative to the shell assembly in first and second directions about an axis of rotation between a continuum of angular positions, stop means for blocking movement of the handle to limit the range of movement of the handle relative to the shell assembly between a first predetermined angular position and a second predetermined angular position, means for locking the handle in a plurality of angular positions relative to the shell assembly between the first and second predetermined angular positions defined by the stop means, a foldable seat including a lower pad and an upper pad coupled to the lower end along an edge thereof, the foldable seat being situated inside the shell assembly adjacent to the lower shell portion to provide means for supporting a lower portion of the infant, first coupling means for coupling the lower pad to the lower shell portion, second coupling means for coupling the upper pad to the upper shell portion, the foldable seat being configured to provide a generally planar seat when the upper shell portion is in the second angular orientation, the foldable seat folding along its edge in response to movement of the upper shell portion relative to the lower shell portion from the second angular orientation to the first generally planar orientation, and a shoulder portion coupled to the upper shell portion and configured to extend toward the lower shell portion, the shoulder portion being movable relative to the lower shell portion upon pivotal movement of the upper and lower shell portions, and a blocking wall formed on the lower shell portion and positioned to engage the shoulder portion upon relative movement of the lower and upper shell portions to block the pivotal movement of the upper shell portion relative to the lower shell portion beyond the second angular orientation.

23. A restraint device for securing and supporting an infant, the device comprising a shell assembly including an upper shell portion configured to support and upper portion of an infant and a lower shell portion configured to support a lower portion of an infant, the upper shell portion including generally rigid end wall defining a boundary of the shell assembly and a yieldable section formed in the end wall, the yieldable section being movable relative to the end wall in response to a force acting against the end wall, the shell assembly being configured to be secured to a seal inside a vehicle by a seat belt, the device further comprising a first loop configured to receive the seat belt therethrough coupled to the lower shell portion, a second loop configured to receive the seat belt therethrough coupled to the upper shell portion spaced apart from the first loop, the first and second loops configured to position and hold the seal belt on the shell assembly to secure the shell assembly to the seat, a handle rotatably coupled to the upper shell portion of the shell assembly for movement relative to the shell assembly in first and second directions about an axis of rotation between a continuum of angular positions, stop means for blocking movement of the handle to limit the range of movement of the handle relative to the shell assembly between a first predetermined angular position and a second predetermined angular position, means for locking the handle in a plurality of angular positions relative to the shell assembly between the first and second predetermined angular positions defined by the stop means, a foldable seat including a lower pad and an upper pad coupled to the lower pad along an edge thereof, the foldable seat being situated inside the shell assembly adjacent to the lower shell portion to provide means for supporting a lower portion of the infant, first coupling means for coupling the lower pad to the lower shell portion, second coupling means for coupling the upper pad to the upper shell portion, the foldable seat being configured to provide a generally planar seat when the upper shell portion is in the second angular orientation, the foldable seat folding along its edge in response to movement of the upper shell portion relative to the lower shell portion from the second angular orientation to the first generally planar orientation.

24. An infant restraint device comprising
an upper shell portion,
a lower shell portion,
means for pivotably coupling the upper shell portion directly to the lower shell portion to permit movement of the upper shell portion relative to the lower shell portion between a first generally planar orientation and a second angular orientation,
a foldable seat situated inside the lower shell portion to provide means for supporting a lower portion of an infant, the foldable seat including an upper section, a lower section, and a flexible section interconnecting the upper end lower sections, and
means for coupling the foldable seat to the lower shell portion and to the upper shell portion so that the foldable seat folds along its flexible section to move from a first position in which the upper and lower seat sections are generally coplanar to form a seat to a second position in which the upper and lower seat sections are situated at an angle with respect to each other in response to movement of the upper shell portion from the second angular orientation to the first generally planar orientation.

25. The device of claim 24, further comprising means for securing the infant to the upper shell portion, the securing means being configured to operate independently of movement of the foldable seat.

26. The device of claim 25, wherein the securing means includes a harness assembly having a lower strap and first and second shoulder straps for securing the infant within the shell assembly, and means for coupling the lower strap and the first and second shoulder straps together so that the shell assembly can be moved from the first generally planar orientation to the second angular orientation with the infant secured by the harness assembly without adjusting the harness assembly.

27. The device of claim 24, wherein the upper shell portion includes a generally rigid end wall defining a boundary of the shell assembly and a yieldable section formed in the end wall, the yieldable section being movable relative to the end wall in response to a force acting against the end wall.

28. The device of claim 24, further comprising a handle rotatably coupled to the upper shell portion of the shell assembly for movement relative to the shell assembly in first and second directions about an axis of rotation between a continuum of angular positions, stop means for blocking movement of the handle to limit the range of movement of the handle relative to the shell assembly between a first predetermined angular position and a second predetermined angular position, and means for locking the handle in a plurality of angular positions relative to the shell assembly between the first and second predetermined angular positions defined by the stop means.

29. The device of claim 24, further comprising a shoulder portion coupled to the upper shell portion and configured to extend toward the lower shell portion, the shoulder portion being movable relative to the lower shell portion upon pivotal movement of the upper shell portion and the lower shell portion, and a blocking wall formed in the lower shell portion and positioned to engage the shoulder portion during relative movement of the lower and upper shell portions to block pivotal movement of the upper shell portion relative to the lower shell portion beyond the second angular orientation.

30. The device of claim 24, further comprising a first loop configured to receive a seat belt therethrough, the first loop being coupled to the lower shell portion, and a second loop being configured to receive the seat belt therethrough, the second loop being coupled to the upper shell portion spaced apart from the first loop, the first and second loops configured to position and hold the seat belt on the shell assembly to secured the shell assembly to a seat inside a vehicle.

31. A restraint device for securing and supporting an infant, the device comprising
an upper shell portion,
a lower shell portion,
means for pivotably coupling the upper shell portion to the lower shell portion to permit movement of the upper shell portion relative to the lower shell portion between a first generally planar orientation and a second angular orientation, the connected upper and lower shell portions defining a chamber sized to receive the infant,
a foldable support member having a predetermined length for supporting a lower portion of the infant, the foldable support member being situated inside the chamber adjacent the lower shell portion, the foldable support member including an upper section, a lower section, and a flexible section interconnecting the upper and lower sections, and
means for coupling the lower section of the foldable support member to the lower shell portion at a first location, and
means for coupling the upper section of the foldable support member to the upper shell portion at a second location spaced apart from the first location by a predetermined distance substantially equal to the predetermined length of the foldable support member when the upper and lower shell portions are in the second angular orientation so that the foldable support member is aligned in a first position in which the upper and lower sections are generally coplanar to provide a seat for the infant, the first coupling location moving closer to the second coupling location in response to movement of the upper shell portion relative to the lower shell portion from the second angular orientation to the first generally planar orientation so that the foldable support member bends along the flexible section to move from the first position to a second position in which the upper and lower sections of the foldable support member are situated at an angle with respect to each other.

32. The device of claim 31, wherein the lower shell portion includes a bottom surface and an end wall having an upper edge, the upper shell portion includes a bottom surface overlapping the bottom surface of the lower shell portion, the lower section of the foldable support member is coupled to the upper edge of the end wall of the lower shell portion, and the upper section of the foldable support member is coupled to the bottom surface of the foldable support member is coupled to the bottom surface of the upper shell portion.

33. The device of claim 31, further comprising means for securing the infant to the upper shell portion, the securing means being configured to operate independently of movement of the foldable seat.

34. The device of claim 33, wherein the securing means includes a harness assembly having a lower strap and first and second shoulder straps for securing the infant within the shell assembly, and means for coupling the lower strap and the first and second shoulder straps together so that the shell assembly can be moved from the first generally planar orientation to the second angular orientation with the infant secured by the harness assembly without adjusting the harness assembly.

35. The device of claim 31, wherein the upper shell portion includes a generally rigid end wall defining a boundary of the shell assembly and a yieldable section formed in the end wall, the yieldable section being movable relative to the end wall in response to a force acting against the end wall.

36. The device of claim 31, further comprising a handle rotatably coupled to the upper shell portion of the shell assembly for movement relative to the shell assembly in first and second directions about an axis of rotation between a continuum of angular positions, and stop means for blocking movement of the handle to limit the range of movement of the handle relative to the shell assembly between a first predetermined angular position and a second predetermined angular position, and means for locking the handle in a plurality of angular positions relative to the shell assembly between the first and second predetermined angular positions defined by the stop means.

37. The device of claim 31, further comprising a shoulder portion coupled to the upper shell portion and configured to extend toward the lower shell portion, the shoulder portion being movable relative to the lower shell portion upon pivotal movement of the upper shell portion and the lower shell portion, and a blocking wall formed in the lower shell portion and positioned to engage the shoulder portion during relative movement of the lower and upper shell portions to block pivotal movement of the upper shell portion relative to the lower shell portion beyond the second angular orientation.

38. The device of claim 31, further comprising a first loop configured to receive a seat belt therethrough, the first loop being coupled to the lower shell portion, and a second loop being configured to receive the seat belt therethrough, the second loop being coupled to the upper shell portion spaced apart from the first loop, the first and second loops configured to position and hold the seal belt on the shell assembly to secure the shell assembly to a seat inside a vehicle.

* * * * *